United States Patent
Hsu

(10) Patent No.: US 10,178,714 B1
(45) Date of Patent: Jan. 8, 2019

(54) ILLUMINATING CIRCUIT WITH A FLICKFREE AUTOMATIC DETECTION AND SHUTDOWN FUNCTION

(71) Applicant: Dong Guan Bright Yinhuey Lighting Co., Ltd. China, Guang Dong (CN)

(72) Inventor: Kevin Hsu, Taichung (TW)

(73) Assignee: Dong Guan Bright Yinhuey Lighting Co., Ltd. China, Guang Dong (CN)

( * ) Notice: Subject to any disclaimer, the term of this patent is extended or adjusted under 35 U.S.C. 154(b) by 0 days.

(21) Appl. No.: 15/893,837

(22) Filed: Feb. 12, 2018

(51) Int. Cl.
*H05B 33/08* (2006.01)
*H02M 1/44* (2007.01)

(52) U.S. Cl.
CPC .......... *H05B 33/0806* (2013.01); *H02M 1/44* (2013.01); *H05B 33/0851* (2013.01)

(58) Field of Classification Search
None
See application file for complete search history.

(56) References Cited

U.S. PATENT DOCUMENTS

| | | | | |
|---|---|---|---|---|
| 5,612,597 | A * | 3/1997 | Wood | H02M 1/425 315/209 R |
| 8,407,546 | B2 * | 3/2013 | Tzannes | H04L 12/5601 714/748 |
| 9,155,174 | B2 * | 10/2015 | Draper | H05B 41/3924 |
| 9,485,830 | B2 * | 11/2016 | Sakai | H05B 33/0824 |
| 2009/0322237 | A1 * | 12/2009 | Bobel | H05B 41/295 315/224 |
| 2011/0025217 | A1 * | 2/2011 | Zhan | H02M 3/335 315/219 |
| 2011/0101877 | A1 * | 5/2011 | Zhan | H05B 33/0815 315/206 |

* cited by examiner

*Primary Examiner* — Crystal L Hammond
(74) *Attorney, Agent, or Firm* — Alan D. Kamrath; Kamrath IP Lawfirm, P.A.

(57) ABSTRACT

An illuminating circuit includes an EMI filter rectifying circuit, an RC absorption circuit, a PWM control circuit, a DC-to-DC converter circuit, an output rectifier filter circuit and a flickfree automatic detection and shutdown circuit. The EMI filter rectifying circuit, the RC absorption circuit, the DC-to-DC converter circuit and the output rectifier filter circuit are in turn electrically connected in series. The PWM control circuit is electrically connected with the EMI filter rectifying circuit and the DC-to-DC converter circuit respectively. The flickfree automatic detection and shutdown circuit is electrically connected with the output rectifier filter circuit and the PWM control circuit respectively.

3 Claims, 1 Drawing Sheet

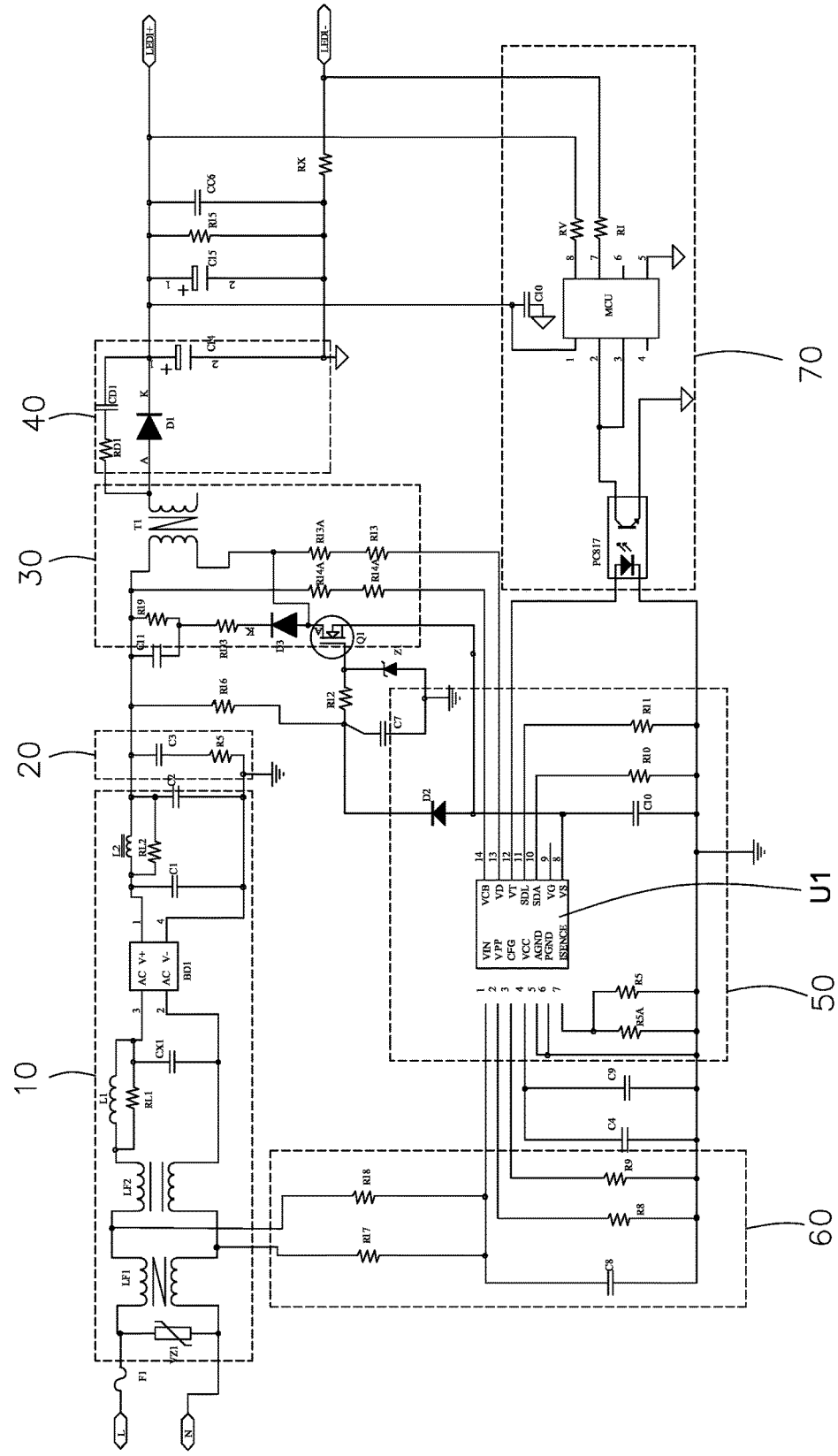

ILLUMINATING CIRCUIT WITH A FLICKFREE AUTOMATIC DETECTION AND SHUTDOWN FUNCTION

BACKGROUND OF THE INVENTION

1. Field of the Invention

The present invention relates to a circuit layout and, more particularly, to an illuminating circuit for a lighting apparatus, such as a lamp or the like.

2. Description of the Related Art

A conventional lighting apparatus comprises a plurality of circuits to provide an illuminating function. Each of the circuits includes a light emitting element, such as an LED. When one of the circuits fails and produces blink or flick, the user has to turn off the light emitting elements of all of the circuits for repair or replacement of the broken light emitting element of the respective circuit, thereby affecting the illuminating function of the lighting apparatus, and thereby causing inconvenience to the user.

BRIEF SUMMARY OF THE INVENTION

The primary objective of the present invention is to provide an illuminating circuit with a flickfree automatic detection and shutdown function.

In accordance with the present invention, there is provided an illuminating circuit comprising an EMI filter rectifying circuit, an RC absorption circuit, a PWM control circuit, a DC-to-DC converter circuit, an output rectifier filter circuit and a flickfree automatic detection and shutdown circuit. The EMI filter rectifying circuit, the RC absorption circuit, the DC-to-DC converter circuit and the output rectifier filter circuit are in turn electrically connected in series. The PWM control circuit is electrically connected with the EMI filter rectifying circuit and the DC-to-DC converter circuit respectively. The flickfree automatic detection and shutdown circuit is electrically connected with the output rectifier filter circuit and the PWM control circuit respectively.

Preferably, the flickfree automatic detection and shutdown circuit includes an MCU and an optical coupler. The MCU detects a voltage of an output terminal of the whole circuit and gets a feedback signal. The optical coupler delivers the feedback signal to the PWM control circuit.

Preferably, the flickfree automatic detection and shutdown circuit further includes a first inductor, a second inductor and a capacitor. The first inductor is electrically connected between a first pin of the MCU and a positive pole of an output terminal of the output rectifier filter circuit. The second inductor is electrically connected between a second pin of the MCU and a negative pole of the output terminal of the output rectifier filter circuit. The MCU has a third pin electrically connected in parallel with the positive pole of the output terminal of the output rectifier filter circuit. The capacitor has a first end electrically connected in parallel with the third pin of the MCU and a second end that is grounded.

Preferably, the flickfree automatic detection and shutdown circuit further includes a dimming signal detection circuit electrically connected between the EMI filter rectifying circuit and the PWM control circuit so that the PWM control circuit is electrically connected with the EMI filter rectifying circuit through the dimming signal detection circuit 60.

According to the primary advantage of the present invention, the MCU of the flickfree automatic detection and shutdown circuit detects the voltage (or current) of the output terminal of the whole circuit and gets a feedback signal, while the optical coupler delivers the feedback signal to the PWM control circuit so as to provide a flickfree automatic detection and shutdown function.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 1 is a circuit layout of an illuminating circuit in accordance with the preferred embodiment of the present invention.

DETAILED DESCRIPTION OF THE INVENTION

Referring to FIG. 1, an illuminating circuit in accordance with the preferred embodiment of the present invention comprises an EMI filter rectifying circuit 10, an RC absorption circuit 20, a PWM control circuit 50, a DC-to-DC converter circuit 30, an output rectifier filter circuit 40 and a flickfree automatic detection and shutdown circuit 70. The EMI filter rectifying circuit 10, the RC absorption circuit 20, the DC-to-DC converter circuit 30 and the output rectifier filter circuit 40 are in turn electrically connected in series. The PWM control circuit 50 is electrically connected with the EMI filter rectifying circuit 10 and the DC-to-DC converter circuit 30 respectively. The PWM control circuit 50 calibrates the power factor of the EMI filter rectifying circuit 10, and changes the current peak value connected by the EMI filter rectifying circuit 10 by regulating the magnitude of the direct-current voltage signal, so as to perform a dimming operation on an LED circuit. It is noted that, the direct-current voltage signal is an output voltage (or current) of a driver of the LED circuit and is used to light the LED circuit. The flickfree automatic detection and shutdown circuit 70 is electrically connected with the output rectifier filter circuit 40 and the PWM control circuit 50 respectively.

In the preferred embodiment of the present invention, the flickfree automatic detection and shutdown circuit 70 includes an MCU "MCU" and an optical coupler "PC817". The MCU "MCU" detects a voltage (or current) of an output terminal of the whole circuit and gets a feedback signal. The optical coupler "PC817" delivers the feedback signal to the PWM control circuit 50.

In the preferred embodiment of the present invention, the flickfree automatic detection and shutdown circuit 70 further includes a first inductor "RV", a second inductor "RI" and a capacitor "C10". The first inductor "RV" is electrically connected between a first pin of the MCU "MCU" and a positive pole of an output terminal of the output rectifier filter circuit 40. The second inductor "RI" is electrically connected between a second pin of the MCU "MCU" and a negative pole of the output terminal of the output rectifier filter circuit 40. The MCU "MCU" has a third pin electrically connected in parallel with the positive pole of the output terminal of the output rectifier filter circuit 40. The capacitor "C10" has a first end electrically connected in parallel with the third pin of the MCU "MCU" and a second end that is grounded.

In the preferred embodiment of the present invention, the flickfree automatic detection and shutdown circuit 70 further includes a dimming signal detection circuit 60 electrically connected between the EMI filter rectifying circuit 10 and the PWM control circuit 50 so that the PWM control circuit 50 is electrically connected with the EMI filter rectifying circuit 10 through the dimming signal detection circuit 60.

In the preferred embodiment of the present invention, the optical coupler "PC817" has an input terminal electrically connected with the MCU "MCU" and an output terminal electrically connected with the PWM control circuit 50.

In the preferred embodiment of the present invention, the input terminal of the optical coupler "PC817" is electrically connected with a fourth pin and a fifth pin of the MCU "MCU". The PWM control circuit 50 includes a chip "U1" having a pin "VT" electrically connected with the output terminal of the optical coupler "PC817". The pin "VT" of the chip "U1" functions as the input terminal of the feedback signal.

In operation, the MCU "MCU" detects variation of the voltage (or current) of the output terminal of the output rectifier filter circuit 40 and gets a feedback signal which is transmitted to the optical coupler "PC817". The optical coupler "PC817" delivers the feedback signal to the pin "VT" of the chip "U1" of the PWM control circuit 50. In such a manner, when the voltage (or current) of the output terminal of the output rectifier filter circuit 40 pulsates, voltage of the pin "VT" of the chip "U1" of the PWM control circuit 50 is changed to a low electrical level, so that the chip "U1" of the PWM control circuit 50 stops operating, to interrupt the voltage (or current) of the output terminal of the output rectifier filter circuit 40, so as to break the voltage (or current) of the LED circuit. Thus, the driver of the LED circuit stops supplying voltage (or current) to the LED circuit to perform the LED shutdown function.

Accordingly, the MCU "MCU" of the flickfree automatic detection and shutdown circuit 70 detects the voltage (or current) of the output terminal of the whole circuit and gets a feedback signal, while the optical coupler "PC817" delivers the feedback signal to the PWM control circuit 50 so as to provide a flickfree automatic detection and shutdown function. In addition, when the flick phenomenon occurs, the LED circuit is shut instantaneously, without affecting operation of other lighting tool in the illuminating circuit, so that the illuminating apparatus of the illuminating circuit is operated normally.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. An illuminating circuit comprising:
an EMI filter rectifying circuit, an RC absorption circuit, a PWM control circuit, a DC-to-DC converter circuit, an output rectifier filter circuit and a flickfree automatic detection and shutdown circuit, wherein:
the EMI filter rectifying circuit, the RC absorption circuit, the DC-to-DC converter circuit and the output rectifier filter circuit are in turn electrically connected in series;
the PWM control circuit is electrically connected with the EMI filter rectifying circuit and the DC-to-DC converter circuit respectively;
the flickfree automatic detection and shutdown circuit is electrically connected with the output rectifier filter circuit and the PWM control circuit respectively;
the flickfree automatic detection and shutdown circuit includes an MCU and an optical coupler;
the MCU detects a voltage of an output terminal of the whole circuit and gets a feedback signal; and
the optical coupler delivers the feedback signal to the PWM control circuit.

2. The illuminating circuit of claim 1, wherein:
the flickfree automatic detection and shutdown circuit further includes a first inductor, a second inductor and a capacitor;
the first inductor is electrically connected between a first pin of the MCU and a positive pole of an output terminal of the output rectifier filter circuit;
the second inductor is electrically connected between a second pin of the MCU and a negative pole of the output terminal of the output rectifier filter circuit;
the MCU has a third pin electrically connected in parallel with the positive pole of the output terminal of the output rectifier filter circuit; and
the capacitor has a first end electrically connected in parallel with the third pin of the MCU and a second end that is grounded.

3. The illuminating circuit of claim 1, wherein the flickfree automatic detection and shutdown circuit further includes a dimming signal detection circuit electrically connected between the EMI filter rectifying circuit and the PWM control circuit so that the PWM control circuit is electrically connected with the EMI filter rectifying circuit through the dimming signal detection circuit.

\* \* \* \* \*